(12) United States Patent  (10) Patent No.: US 9,315,712 B2
Van Zanten et al.  (45) Date of Patent: Apr. 19, 2016

(54) VISCOELASTIC SURFACTANTS AND METHODS OF MAKING AND USING SAME

(75) Inventors: Ryan Van Zanten, Spring, TX (US); Douglas J. Harrison, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 440 days.

(21) Appl. No.: 12/419,893

(22) Filed: Apr. 7, 2009

(65) Prior Publication Data

US 2010/0256025 A1    Oct. 7, 2010

(51) Int. Cl.
  C09K 8/60    (2006.01)
  C09K 8/035   (2006.01)
  C04B 28/02   (2006.01)
  C04B 40/00   (2006.01)
  C09K 8/40    (2006.01)
  C09K 8/42    (2006.01)
  C09K 8/68    (2006.01)

(52) U.S. Cl.
  CPC .......... *C09K 8/035* (2013.01); *C04B 28/02* (2013.01); *C04B 40/0039* (2013.01); *C09K 8/40* (2013.01); *C09K 8/42* (2013.01); *C09K 8/602* (2013.01); *C09K 8/68* (2013.01); *C09K 2208/30* (2013.01)

(58) Field of Classification Search
  None
  See application file for complete search history.

(56) References Cited

U.S. PATENT DOCUMENTS

| | | | |
|---|---|---|---|
| 3,985,686 A | 10/1976 | Barrat | |
| 4,695,389 A | 9/1987 | Kubala | |
| 4,725,372 A | 2/1988 | Teot et al. | |
| 5,551,516 A | 9/1996 | Norman et al. | |
| 5,913,364 A | 6/1999 | Sweatman | |
| 6,167,967 B1 | 1/2001 | Sweatman | |
| 6,258,757 B1 | 7/2001 | Sweatman et al. | |
| 6,306,800 B1 | 10/2001 | Samuel et al. | |
| 6,468,945 B1 | 10/2002 | Zhang | |
| 6,613,720 B1 * | 9/2003 | Feraud et al. | 507/200 |
| 6,637,517 B2 | 10/2003 | Samuel et al. | |
| 6,703,352 B2 | 3/2004 | Dahayanake et al. | |
| 6,875,728 B2 * | 4/2005 | Gupta et al. | 507/240 |
| 6,881,709 B2 | 4/2005 | Nelson et al. | |
| 6,908,888 B2 | 6/2005 | Lee et al. | |
| 6,929,070 B2 * | 8/2005 | Fu et al. | 166/308.2 |
| 7,036,585 B2 | 5/2006 | Zhou et al. | |
| 7,084,095 B2 | 8/2006 | Lee et al. | |
| 7,238,648 B2 | 7/2007 | Dahayanake et al. | |
| 7,279,446 B2 | 10/2007 | Colaco et al. | |
| 2003/0019627 A1 * | 1/2003 | Qu et al. | 166/281 |

(Continued)

FOREIGN PATENT DOCUMENTS

WO  0129369 A1  4/2001
WO  0183946 A1  11/2001

OTHER PUBLICATIONS

Crews, James B., et al., "New technology improves performance of viscoelastic surfactant fluids," SPE 103118, SPE Drilling & Completion, Mar. 2008, pp. 41-47, Society of Petroleum Engineers.

(Continued)

*Primary Examiner* — John J Figueroa
(74) *Attorney, Agent, or Firm* — Haynes and Boone, LLP

(57) ABSTRACT

A method of servicing a wellbore comprising placing downhole a composition comprising a surfactant package comprising a cationic surfactant and anionic surfactant, wherein the surfactant package when contacted with an aqueous solution forms a viscosified composition in the presence of less than about 30 wt. % of a hydrotrope.

25 Claims, 13 Drawing Sheets

(56) References Cited

U.S. PATENT DOCUMENTS

| | | | |
|---|---|---|---|
| 2003/0114315 A1* | 6/2003 | Schwartz et al. | 507/121 |
| 2003/0125215 A1* | 7/2003 | Schwartz et al. | 507/121 |
| 2007/0032386 A1 | 2/2007 | Abad et al. | |
| 2007/0111896 A1* | 5/2007 | Knox et al. | 507/209 |
| 2007/0213232 A1 | 9/2007 | Hartshorne et al. | |
| 2008/0305157 A1 | 12/2008 | English et al. | |

OTHER PUBLICATIONS

Davies, Tanner S., et al., "Self-assembly of surfactant vesicles that transform into viscoelastic wormlike micelles upon heating," J. Am. Chem. Soc., 2006, pp. 6669-6675, vol. 128, No. 20, American Chemical Society.
Herb, Craig A., et al., Editors, "Structure and flow in surfactant solutions," ACS Symposium Series 578, 1994, 2 pages, American Chemical Society.
Israelachvili, Jacob, "Intermolecular and surface forces," Second Edition, 1991, 2 pages, Academic Press.
Kaler, Eric W, et al., "Phase behavior and structures and mixtures of anionic and cationic surfactants," The Journal of Physical Chemistry, 1992, pp. 6698-6707, vol. 96, No. 16, American Chemical Society.
Macosko, Christopher W., "Rheology: principles, measurements, and applications," Oct. 27, 1994, 1 page, Wiley-VCH.
Raghavan, Srinivasa R., et al., "Wormlike micelles formed by synergistic self-assembly in mixtures of anionic and cationic surfactants," Langmuir, 2002, pp. 3797-3803, vol. 18, No. 10, American Chemical Society.
Samuel, M., et al., "A new solids-free non-damaging high temperature lost-circulation pill: development and first field applications," SPE 81494, 2003, pp. 1-12, Society of Petroleum Engineers Inc.
Samuel, Mathew, et al., "Polymer-free fluid for hydraulic fracturing," SPE 38622, 1997, pp. 553-559, Society of Petroleum Engineers, Inc.
Schubert, Beth A., et al., "The microstructure and rheology of mixed cationic/anionic wormlike micelles," Langmuir, 2003, pp. 4079-4089, vol. 19, No. 10, American Chemical Society.
Foreign communication from a related counterpart application—International Search Report and Written Opinion, PCT/GB2010/000473, May 26, 2010, 12 pages.
Tondre, Christian, et al., "Properties of the amphiphilic films in mixed cationic/anionic vesicles: a comprehensive view from a literature analysis," Advances in Colloid and Interface Science, 2001, pp. 115-134, vol. 93, Elsevier Science B.V.
Notification of Second Office Action issued for Chinese Patent Application No. 2010800250878 on Nov. 14, 2014. (4 pages).
Examination Report issued for GCC Patent Application No. GC 2010-15611 on Sep. 3, 2014. (3 pages).
Patent Examination Report No. 1 for Australian Patent Application No. 2010233529 issued Aug. 15, 2012 (3 pages).
Patent Examination Report No. 2 for Australian Patent Application No. 2010233529 issued Apr. 5, 2013 (3 pages).
Patent Examination Report No. 3 for Australian Patent Application No. 2010233529 issued Aug. 6, 2013 (3 pages).
Examination Report for Canadian Patent Application No. 2,757,103 issued Oct. 1, 2012 (3 pages).
Examination Report for Canadian Patent Application No. 2,757,103 issued Jun. 5, 2013 (2 pages).
Examination Report for Canadian Patent Application No. 2,757,103 issued May 26, 2014 (2 pages).
Examination report for Chinese Patent Application No. 201080025087.8 issued Feb. 17, 2014 (8 pages).
Technical Report on Egyptian Patent Application No. 2011101689, date unknown (4 pages).
Technical Report on Egyptian Patent Application No. 2011101689, date unknown (3 pages).
Communication pursuant to Article 94(3) EPC for EP Patent Application No. 10709028.4 issued Jun. 12, 2014 (8 pages).
Examination Report for GC Patent Application No. 2010-15611 issued Nov. 18, 2013 (4 pages).
Examination Report for GC Patent Application No. 2010-15611 issued Apr. 22, 2014 (3 pages).
Examination Report for Mexican Patent Application No. MX/a/2011/010626 issued Sep. 2, 2014 (3 pages).

\* cited by examiner

VISCOELASTIC SURFACTANTS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure generally relates to wellbore servicing fluids. More particularly, this disclosure relates to viscoelastic surfactants and methods of making and using same.

2. Background

Natural resources such as gas, oil, and water residing in a subterranean formation or zone are usually recovered by drilling a wellbore down to the subterranean formation while circulating a drilling fluid in the wellbore. During the drilling of a well bore a drilling fluid may be circulated down through the inside of the drill string, through the drill bit, and to the surface through the annulus between the walls of the well bore and the drill string. The drill string may be a drill pipe, a casing string, or any other suitable conduit. Among other things, the circulating drilling fluid lubricates the drill bit, carries drill cuttings to the surface, and balances the formation pressure exerted on the well bore. One problem associated with the drilling of a well bore may be the undesirable loss of large amounts of the drilling fluid into the subterranean formation. This problem may be referred to as "lost circulation" and the sections of the formation into which the drilling fluid is lost are referred to as "lost circulation zones." In addition to drilling fluids, problems with lost circulation may also be encountered with other fluids, for example, spacer fluids, completion fluids (e.g., brines) and workover fluids that may be circulated in a well bore. Herein a spacer fluid refers to any liquid used to physically separate one special-purpose liquid from another; a completion fluid refers to a solids-free liquid used to facilitate final operations prior to initiation of production; and a workover fluid refers to a well-control fluid, that is used during the performance of maintenance or remedial treatments on a hydrocarbon producing well. A variety of factors may be responsible for lost circulation. For example, the subterranean formation penetrated by the well bore may be highly permeable or may contain fractures or crevices therein. Furthermore, the formation may breakdown under the hydrostatic pressure applied by the fluid, thereby allowing the fluid to be lost into the formation. For instance, fractures in the subterranean formation may be created or enhanced due to the hydrostatic pressure of the drilling fluid with the resulting loss of drilling fluid into those fractures.

A number of methods have been developed to control lost circulation. One method commonly used to control lost circulation involves the placement of lost circulation materials into the lost circulation zone. These lost circulation materials may be placed into the formation for example as lost circulation pills in an attempt to control and/or prevent lost circulation. Conventional lost circulation pills may suffer from a variety of drawbacks such as the large amount of materials needed to achieve desired properties (e.g., viscosities, etc.) and difficulties associated with removing the component materials of the pill once the treatment has been completed. Thus, it would be desirable to develop improved compositions for controlling lost circulation.

SUMMARY

Disclosed herein is a method of servicing a wellbore comprising placing downhole a composition comprising a surfactant package comprising a cationic surfactant and anionic surfactant, wherein the surfactant package when contacted with an aqueous solution forms a viscosified composition in the presence of less than about 30 wt. % of a hydrotrope.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
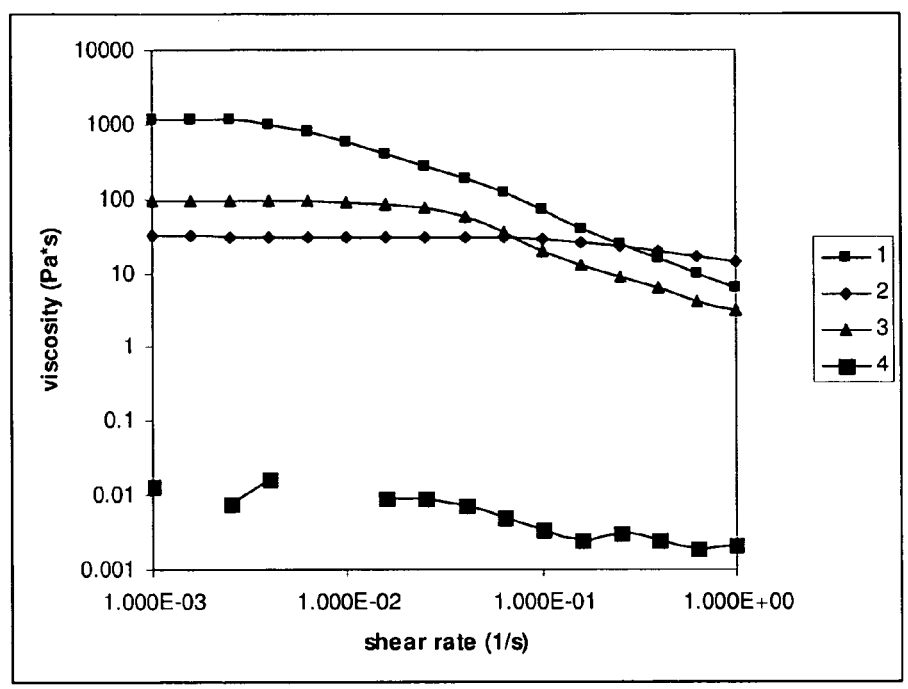
FIGS. 1 and 2 are plots of viscosity as a function of shear rate for the samples from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are compositions (e.g., wellbore servicing compositions) comprising at least one cationic surfactant and at least one anionic surfactant. Such compositions are said to contain a cationic anionic surfactant package (CASP). In an embodiment, the CASP may react with one or more components of the wellbore servicing fluid to form a viscosified composition hereinafter denoted CASP-VC. A CASP-VC of the type described herein may be useful in various wellbore servicing operations. For example, the CASP-VC may be useful in the treatment of wellbores experiencing lost circulation. The components of the CASP and CASP-VC as well as methods of making and using same will be described in more detail later herein.

In an embodiment, the CASP comprises a cationic surfactant. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease. Herein a cationic surfactant has a positively charged head and a hydrophobic tail comprising a carbon chain. A cationic surfactant suitable for use in this disclosure may have a carbon chain having a length of from about 8 to about 24, alternatively from about 8 to about 18, alternatively from about 12 to about 22, alternatively from about 16 to about 24. Examples of cationic surfactants suitable for use in this disclosure include without limitation quaternary ammonium salts, ethoxylated quaternary ammonium salts, amine oxides, or a combination thereof. In an embodiment, the cationic surfactant comprises stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, or a combination thereof. In an embodiment, the cationic surfactant may be present in the CASP in an amount of from about 0.01 weight percent (wt. %) based on the total weight of the CASP to about 99.99 wt. %, alternatively from about 0.1 wt. % to about 99.9 wt. %, alternatively from about 1 wt. % to about 99 wt. %.

In an embodiment, the CASP comprises an anionic surfactant. Herein an anionic surfactant has a negatively charged head and a hydrophobic tail comprising a carbon chain. An anionic surfactant suitable for use in this disclosure may have carbon chain having a length of from about 8 to about 24, alternatively from about 8 to about 18, alternatively from about 12 to about 22, alternatively from about 18 to about 24. Examples of anionic surfactants suitable for use in this disclosure include without limitation alkali salts of acids, alkali salts of fatty acids, alkaline salts of acids, sodium salts of acid, sodium salts of fatty acid, alkyl sulphates, alkyl ethoxylate, sulphates, sulfonates, soaps, or a combination thereof. In an embodiment, the anionic surfactant comprises sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, or a combination thereof.

In an embodiment, the anionic surfactant may be present in the CASP in an amount of from about 0.01 weight percent (wt. %) based on the total weight of the CASP to about 99.99 wt. %, alternatively from about 0.1 wt. % to about 99.9 wt. %, alternatively from about 1 wt. % to about 99 wt. %.

In an embodiment the amount of cationic surfactant present in the CASP is greater than the amount of anionic surfactant and such a composition is termed a cationic rich CASP. Alternatively, the amount of anionic surfactant present in the CASP is greater than the amount of cationic surfactant and such a composition is termed an anionic rich CASP.

In an embodiment, the cationic surfactant:anionic surfactant ratio (CAR) may be chosen by one of ordinary skill in the art with the benefits of this disclosure so as to mitigate unwanted effects normally associated with the contacting of a surfactant package with other materials. For example, the CAR may be chosen so as to reduce or eliminate phase separation when the CASP is contacted with an aqueous solution. Further, the CAR may be chosen so as reduce or eliminate precipitation of one or both components of the CASP when contacted with an aqueous solution. For example, the CAR may be from about 1:100 to about 100:1; alternatively from about 90:1 to about 1:90; alternatively from about 80:1 to about 1:80; alternatively from about 70:1 to about 1:70; alternatively from about 60:1 to about 1:60; alternatively from about 1:50 to about 50:1; alternatively from about 40:1 to about 1:40; alternatively from about 30:1 to about 1:30; alternatively from about 20:1 to about 1:20; alternatively from about 10:1 to about 1:10; alternatively from about 1:9 to about 9:1.

In an embodiment, a CASP (e.g., a cationic rich CASP, an anionic rich CASP) may be contacted with an aqueous solution to form a CASP-VC. The aqueous solution may comprise fresh water or salt water, e.g., an unsaturated aqueous salt solution or a saturated aqueous salt solution such as brine or seawater. The aqueous solution and CASP may be contacted in any manner known to one of ordinary skill in the art with the benefits of this disclosure. In an embodiment the aqueous solution comprises a brine. The brine may be any suitable saturated or a nearly saturated saltwater solution. For example, the brine may be any suitable saturated or a nearly saturated salt solution comprising water and greater than about 90, 95, 99, or 99.9 wt. % salt. Nonlimiting examples of brines suitable for use in this disclosure include ammonium chloride, potassium chloride, sodium chloride, zinc bromide, calcium chloride, calcium bromide, sodium bromide, potassium formate, sodium formate, cesium formate or a combination thereof. In an embodiment, the CASP may be contacted with the aqueous solution in an amount of from about 0.01 g to about 20 g CASP per 80 g aqueous solution, alternatively from about 0.1 g to about 15 g CASP per 80 g aqueous solution, alternatively from about 1 g to about 10 g CASP per 80 g aqueous solution.

The CASP-VC described herein may exhibit viscoelastic behavior. Viscoelastic materials exhibit both viscous and elastic characteristics when undergoing deformation. In an embodiment, the viscoelasticity of the CASP-VC may be adjusted to meet a user or process-desired need by adjustment of the CAR or the total concentration of surfactant. The ability to adjust or tune the viscoelasticity of the CASP-VC may allow a user to select an appropriate CASP-VC based on the needs of a wellbore and its processing requirements. For example, the CAR may be optimized to produce a CASP-VC having a viscosity suitable for use in lost circulation zones at higher depth or at an elevated temperature.

In an embodiment, the CASP-VC may exhibit a viscosity ranging from about 0.001 Pa*s to about 100,000 Pa*s, alternatively from 1 Pa*s about to about 100,000 Pa*s, alternatively from about 100 Pa*s to about 100,000 Pa*s over a temperature range of from about 10° C. to about 200° C., alternatively from about 25° C. to about 200° C., alternatively from about 50° C. to about 200° C. Viscosity is a measure of the resistance of a fluid which is being deformed by shear stress. In other words, it is the resistance of a liquid to flow. Determination of the properties described herein may be made using any suitable methodology known to one of ordinary skill in the art. For example, the storage modulus, loss modulus and viscosity may be determined by applying a constant shear rate to the CASP-VC and reading the shear stress using a narrow gap cup in bob geometry as described in

*Rheology: Principles, Measurements and Applications*, by C. W. Macosko, Wiley-VCH, New York (1994) which is incorporated by reference herein in its entirety.

In an embodiment, the CASP-VC may exhibit a zero shear viscosity of from about 0.001 Pa*s to about 100,000 Pa*s, alternatively from about 1 Pa*s to about 100,000 Pa*s, alternatively from about 100 Pa*s to about 100,000 Pa*s over a temperature range of from about 10° C. to about 200° C., alternatively from about 25° C. to about 200° C., alternatively from about 50° C. to about 200° C. Zero shear viscosity refers to the viscosity at the limit of low shear rate. The zero shear viscosity is the viscosity a product will ultimately attain when at rest and undisturbed. The zero shear viscosity was determined as described previously herein with the exception that the data was extrapolated to "zero" shear and the viscosity read at that shear.

In an embodiment, the CASP-VC has a complex viscosity of from about 10 Pa*s to about 100,000 Pa*s, alternatively from about 100 Pa*s to about 100,000 Pa*s, alternatively from about 1,000 Pa*s to about 100,000 Pa*s for a range of frequencies of from about 0.00001 Hz to about 1,000 Hz, alternatively from about 0.01 Hz to about 1,000 Hz, alternatively from about 1 Hz to about 1,000 Hz. Complex viscosity refers a frequency-dependent viscosity function determined during forced harmonic oscillation of shear stress. It is related to the complex shear modulus and represents the angle between the viscous stress and the shear stress. The complex viscosity function is equal to the difference between the dynamic viscosity and the out-of-phase viscosity, or imaginary part of the complex viscosity:

$$\eta^*(i\omega)=\eta'(\omega)-i\eta''(\omega)$$

where
$\eta^*$=complex viscosity
$\eta'$=dynamic viscosity
$\eta''$=out-of-phase viscosity
The complex viscosity was determined as described previously herein with the exception that the frequency was kept constant.

The storage modulus in viscoelastic materials measures the stored energy and represents the elastic portion of the material. The loss modulus relates to the energy dissipated as heat and represents the viscous portion related to the amount of energy lost due to viscous flow. In an embodiment, the CASP-VC has a storage modulus of from about 0.001 Pa to about 1,000 Pa, alternatively from about 0.1 Pa to about 1,000 Pa, alternatively from about 1 Pa to about 1,000 Pa for a range of frequencies of from about 0.00001 Hz to about 1,000 Hz, alternatively from about 0.01 Hz to about 1,000 Hz, alternatively from about 1 Hz to about 1,000 Hz. In another embodiment, the CASP-VC has a loss modulus of from about 0.001 Pa to about 1,000 Pa, alternatively from about 0.1 Pa to about 1,000 Pa, alternatively from about 1 Pa to about 1,000 Pa for a range of frequencies of from about 0.00001 Hz to about 1,000 Hz, alternatively from about 0.01 Hz to about 1,000 Hz, alternatively about 1 Hz to about 1,000 Hz. The storage modulus and loss modulus were determined as described previously herein.

In an embodiment, the CASP-VC is solids free. Herein, solids free refers to the amount of solid being equal to or less than about 3 wt. %, alternatively equal to or less than about 2 wt. %, alternatively equal to or less than about 1 wt. % based on the total weight of the CASP. Examples of solids include without limitation particles, sands, formation materials, or a combination thereof.

In an embodiment, the CASP-VC can withstand high pressure gradients. The high viscoelasticity generated by the CASP allows the fluid to resist high pressure gradients.

In an embodiment, CASPs of the type described herein may be introduced to a wellbore servicing fluid or to a wellbore and carry out its intended function in the substantial absence of a hydrotrope and/or excess salt (e.g., the CASP is free, substantially free, or does not contain a material amount of a hydrotrope and/or excess salt). Both hydrotropes and excess salt are used to stabilize micellar growth. Herein a hydrotrope refers to a compound that solubilises hydrophobic compounds in aqueous solutions. Typically, hydrotropes consist of a hydrophilic part and a hydrophobic part (like surfactants) but the hydrophobic part is generally too small to cause spontaneous self-aggregation. Examples of hydrotropes include for example and without limitation sodium p-toluenesulfonate, sodium xylene sulfonate, sodium salicylate, alkyl alcohols, or a combination thereof. In alternative embodiments, the CASPs are introduced to a wellbore servicing fluid or to a wellbore and carry out its intended function in the presence of a hydrotrope. In an embodiment, the CASP comprises less than or equal to about 30, 20, 10, 9, 8, 7, 6, 5, 4, 3, 2, 1, 0.1, 0.01, or 0.001 wt % of one or more hydrotropes based upon the total weight of the CASP. In an embodiment, the CASP comprises an amount of salt equal to or less than the saturation amount. In an embodiment, the CASP comprises an excess amount of salt equal to or less than about 1.0, 0.1, 0.01, 0.001, or 0.0001 weight percent over the saturation amount (i.e., ≤1.0, 0.1, 0.001, or 0.0001 wt % excess salt).

Without wishing to be limited by theory, the tunable viscoelasticity of the CASP-VC disclosed herein may be attributed to the mechanism of micelle growth in these compositions. One mechanism for the formation and growth of micelles may involve the electrostatic interactions of a cationic surfactant and an anionic surfactant (e.g., CASP). In this mechanism, the CASP interacts to form a pseudo-double tailed zwitterionic surfactant that self assembles into a surfactant bilayer in the form of lamellar sheets of vesicles or wormlike micelles. The presence of salt (e.g. hydrotrope) may facilitate the growth of micelles or the creation of multilamellar vesicles because of interaction between cationic and anionic surfactant, cationic/anionic surfactant and hydrotrope, and cationic/anionic surfactant and inorganic salt.

In addition, the chain length of the cationic and anionic surfactant may affect the resulting micelles. When the cationic and anionic surfactants are of similar chain length, there is a wider phase space where the bilayer aggregates are stable. However, when there is a difference in chain lengths, the bilayer phase space will be smaller, thus stabilizing the micelles over a wider concentration range. To generate chain length difference between the cationic and anionic surfactants, the amount of cationic surfactant may be much larger when compared to the anionic surfactant or vice versa. Further, even at equimolar amounts of cationic and anionic surfactants wherein the chain length difference between the cationic and anionic surfactants is sufficiently large, a micelle phase will be stable. However, a micelle phase will not be stable if the cationic and anionic surfactants have similar chain lengths.

The second proposed mechanism involves a phase transition of the CASP from a low viscosity vesicle phase (e.g., near that of water with 1 vol. % spheres) to a higher viscosity viscoelastic phase by an increase in temperature. Herein, a higher viscosity viscoelastic phase refers to an amount higher than that of the vesicle phase while at the same overall concentration of surfactant. In this mechanism, a unilamellar vesicle bilayer phase is created by mixing the cationic surfactant and the anionic surfactant. In contrast to the first mechanism where a difference in carbon chain length aids in micelles formation, the amount of the cationic surfactant may be similar to the anionic surfactant in the vesicle phase, for example a 1:1 CAR. As temperature increases, the surfactant exchange rate between the vesicle and water will increase. The increase occurs more rapidly for a shorter chain surfactant than for a longer chain surfactant, leading to a lower concentration (e.g., as determined by nuclear magnetic resonance) of one surfactant in the bilayer, thus possibly promoting the growth of micelles.

The third proposed mechanism involves development of a spontaneous curvature by mixing surfactants and creating a defect ridden lamellar phase with gel-like qualities as visualized using standard imaging techniques. In this mechanism, a cationic/anionic gel is formed by a lamellar defect phase. At high double-tailed surfactant concentration (e.g., low water contents, equal to or greater than about 50 wt. % surfactant), a lamellar sheet ($L_{alpha}$) phase is often formed. As the water content is increased to an amount of from about 60 wt. % to about 80 wt. %, the bilayer spacing generally swells to a certain spacing that expel any excess water that is added. This spacing may be determined using any suitable technique such as small angle x-ray scattering technique. In the case of cationic/anionic bilayers ("pseudo" double tailed surfactants), a spontaneous curvature exists that leads to multilamellar vesicle (MLV) defect sites existing with the lamellar sheet phase as more water is added. The formation of MLV defect sites within the lamellar sheet phase further leads to lamellar sheets entangled with MLV defect sites, thereby creating a highly viscoelastic gel with a viscosity greater than 1,000 centipoise.

In an embodiment, a CASP-VC of the type described herein may be used to control lost circulation in a subterranean formation. It is to be understood that "subterranean formation" encompasses both areas below exposed earth and areas below earth covered by water such as ocean or fresh water. In the process of drilling a well, low fracture gradients zones, fractured zones, etc. are often encountered and loss of whole drilling fluid to the formation becomes a problem. Losses of drilling fluid can impede the progress of drilling the well, add cost to the drilling of the well, prevent the drilling of the well to target depth, and/or cause the total loss of the drilled open hole section. In such an embodiment, the CASP may be introduced into a drill string, pumped down to a lost circulation zone such as voids, vugular zones, and natural or induced fractures while drilling. The CASP may then contact a fluid in the lost circulation zone and form a CASP-VC that substantially seals the lost circulation zone with little or no interruption of drilling operations and reduction in loss of drilling fluid to the lost circulation zone.

In another embodiment, a CASP may be pumped down to a lost circulation zone, a wellbore servicing fluid may be introduced from the wellbore to the lost circulation zone wherein the CASP contacts the wellbore servicing fluid and forms a CASP-VC that substantially seals the lost circulation zone. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids, gravel pack fluids, or completion fluids, all of which are well known in the art. Methods for introducing compositions into a wellbore to seal subterranean zones are described in U.S. Pat. Nos. 5,913,364; 6,167,967; and 6,258,757, each of which is incorporated by reference herein in its entirety.

The CASP-VC may form a non-flowing, intact mass of high viscosity inside the lost circulation zone which plugs the zone and inhibits loss of subsequently pumped fluid. In an embodiment, the CAR is adjusted so as to produce a high viscosity CASP-VC that plugs a zone at elevated temperatures, such as those found at higher depths within a wellbore.

In another embodiment, the CASP-VCs form lost circulation pills for use in completion brines. The CASP-VCs disclosed herein may form solids free post perforation pills and/or post gravel pack fluid loss pills that are useful in servicing a wellbore during completion operations.

In an embodiment, a CASP-VC is used to service a wellbore. Subsequently, the viscoelasticity of a CASP-VC may be broken (i.e., the viscosity of the CASP-VC may be reduced) by contacting the CASP-VC with an effective amount of a viscosity breaker such as a hydrocarbon or an internal breaker. The ability to break the viscosity of a CASP-VC may be useful for example for wellbore cleanup. Examples of internal breakers suitable for use in this disclosure include without limitation SP breaker, VICON NF breaker, OXOL II breaker, GBW-40 breaker, and HT breaker, which are commercially available from Halliburton. Examples of hydrocarbons suitable for use in this disclosure include for example and without limitation crude oil, natural gas and gas hydrates. Effective amounts of hydrocarbons and internal breakers may be determined by one of ordinary skill in the art with the aid of this disclosure.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The rheological behavior of CASP-VCs of the type described herein was investigated. Eight samples, designated Samples 1-8, were prepared. Samples 1-4 were prepared using sodium oleate (NaOle), which is commercially available from TCI America as the anionic surfactant and octyl trimethyl ammonium chloride ($C_8TAC$), which is commercially available from TCI America as the cationic surfactant. Samples 1-4 were prepared using a $C_8TAC$:NaO ratio of 3:7, 4:6, 2:8, and 1:9 respectively. The samples were then dissolved in deionized water (DI $H_2O$) in sufficient quantity to form a 3 wt. % solution. Since Samples 1-4 had larger anionic ratio to cationic, the resulting CASP-VCs were anionic rich.

Sample 5-8 were prepared using sodium octoate (NaCap), which is commercially available from TCI America as the anionic surfactant and stearyltrimethylammonium chloride ($C_{18}TAC$), which is commercially available from TCI America as the cationic surfactant. Samples 5-8 were prepared using a $C_{18}TAC$:NaCap ratio of 7:3 6:4, 8:2, and 9:1 respectively. The samples were then dissolved in deionized water (DI $H_2O$) in sufficient quantity to form a 3 wt. % solution. Since Samples 5-8 had larger cationic ratio to anionic, the resulting CASP-VCs were cationic rich. Table 1 tabulates the cationic and anionic surfactant types, and ratios for each sample.

TABLE 1

| Sample | Cationic Surfactant | Anionic Surfactant | CAR | Weight % |
|---|---|---|---|---|
| 1 | $C_8$TAC | NaO | 3:7 | 3 |
| 2 | $C_8$TAC | NaO | 4:6 | 3 |
| 3 | $C_8$TAC | NaO | 2:8 | 3 |
| 4 | $C_8$TAC | NaO | 1:9 | 3 |
| 5 | $C_{18}$TAC | NaCap | 7:3 | 3 |
| 6 | $C_{18}$TAC | NaCap | 6:4 | 3 |
| 7 | $C_{18}$TAC | NaCap | 8:2 | 3 |
| 8 | $C_{18}$TAC | NaCap | 9:1 | 3 |

Rheological measurements were performed using an MCR 501 with a concentric cylinder of 27 mm, which is a commercially available rheometer from Anton Paar at a temperature of 25° C.

Figure 2:
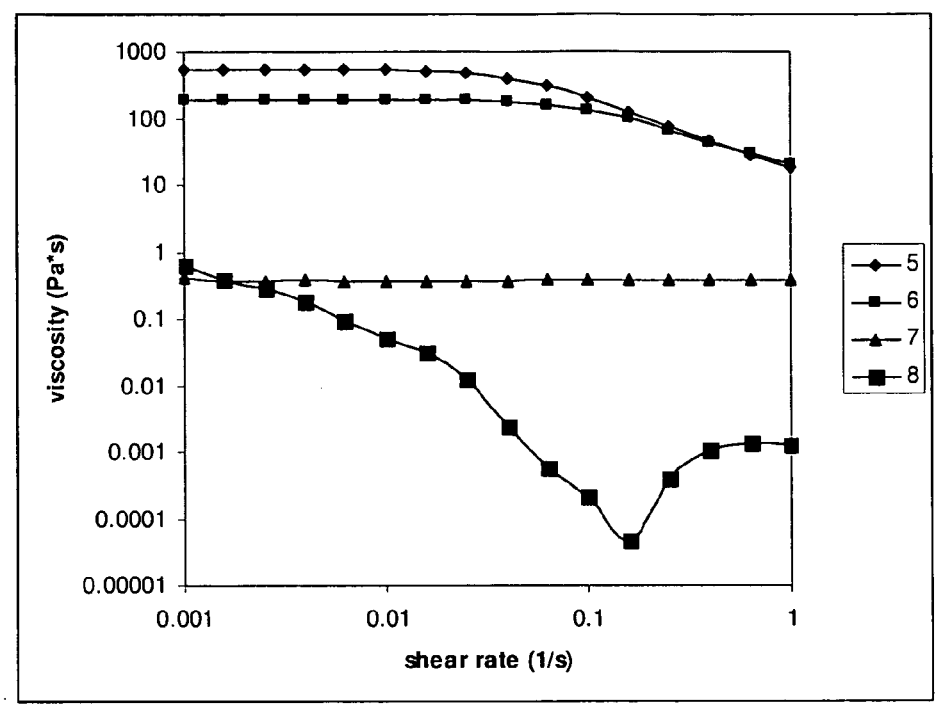

FIG. 1 is a plot of viscosity as a function of shear rate for Samples 1-4. FIG. 2 is a plot of viscosity as a function of shear rate for Samples 5-8. The zero shear viscosities of Samples 1-4 may be determined by extrapolating the viscosity back to the theoretical zero-shear point and were 1200, 93, 33, and 0.006 Pa*s respectively. The zero shear viscosities of Samples 5-8 may be determined by extrapolating the viscosity back to the theoretical zero-shear point and were 542, 196, 0.4, and 0.001 respectively. The results demonstrated that the zero-shear viscosity is highly dependent on the cationic/anionic ratio and can be tuned by varying it. Also, over a million fold increase in viscosity can be generated by adding an oppositely charged surfactant independent of salt or hydrotrope concentration.

Example 2

The zero shear viscosity of an anionic rich and a cationic rich CASP-VCs were investigated. Samples 1-8, described in Example 1, were used again in this example. In addition, five more samples, designated Samples 9-13, were prepared as described in Example 1. Table 2 tabulates the cationic and anionic surfactant types and CARs for Samples 9-13.

TABLE 2

| Sample | Cationic Surfactant | Anionic Surfactant | CAR | Weight % |
|---|---|---|---|---|
| 9 | $C_8$TAC | NaO | 5:5 | 3 |
| 10 | $C_8$TAC | NaO | 6:4 | 3 |
| 11 | $C_8$TAC | NaO | 0:10 | 3 |
| 12 | $C_{18}$TAC | NaCap | 5:5 | 3 |
| 13 | $C_{18}$TAC | NaCap | 4:6 | 3 |

Figure 3:
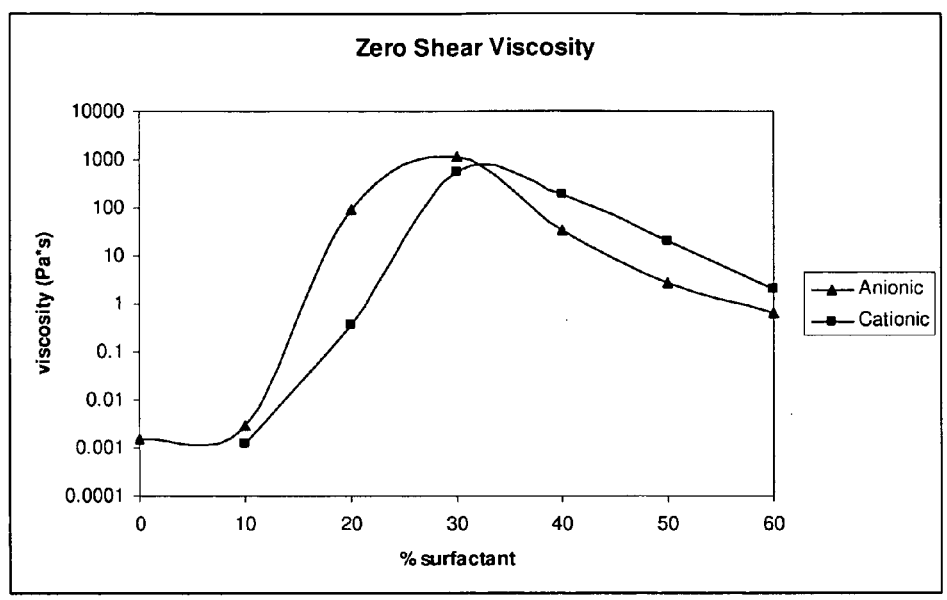
FIG. 3 is a plot of viscosity as a function of percent surfactant for the samples from Example 2.

FIG. 3 is a plot of viscosity as a function of weight fraction of minor component for Samples 1-13. For Samples 1-4 and 9-11, the minor component was the cationic surfactant. For Samples 5-8 and 12-13, the minor component was the anionic surfactant. The results demonstrated that the CAR that created the maximum viscosity was about 70:30 and 30:70, as shown by the peaks for the anionic rich and the cationic rich CASP-VCs on FIG. 3. In addition, both the cationic rich and the anionic rich CASP-VCs exhibited pronounced increases in viscoelasticity up to 300,000 fold when compared to the individual surfactant components. This increase in viscoelasticity was also observed visually by placing Sampled 1 and 5 in separate vials and inverting both vials. In both vials, the viscoelastic gel samples remained suspended for over 10 seconds.

Example 3

Figure 4:
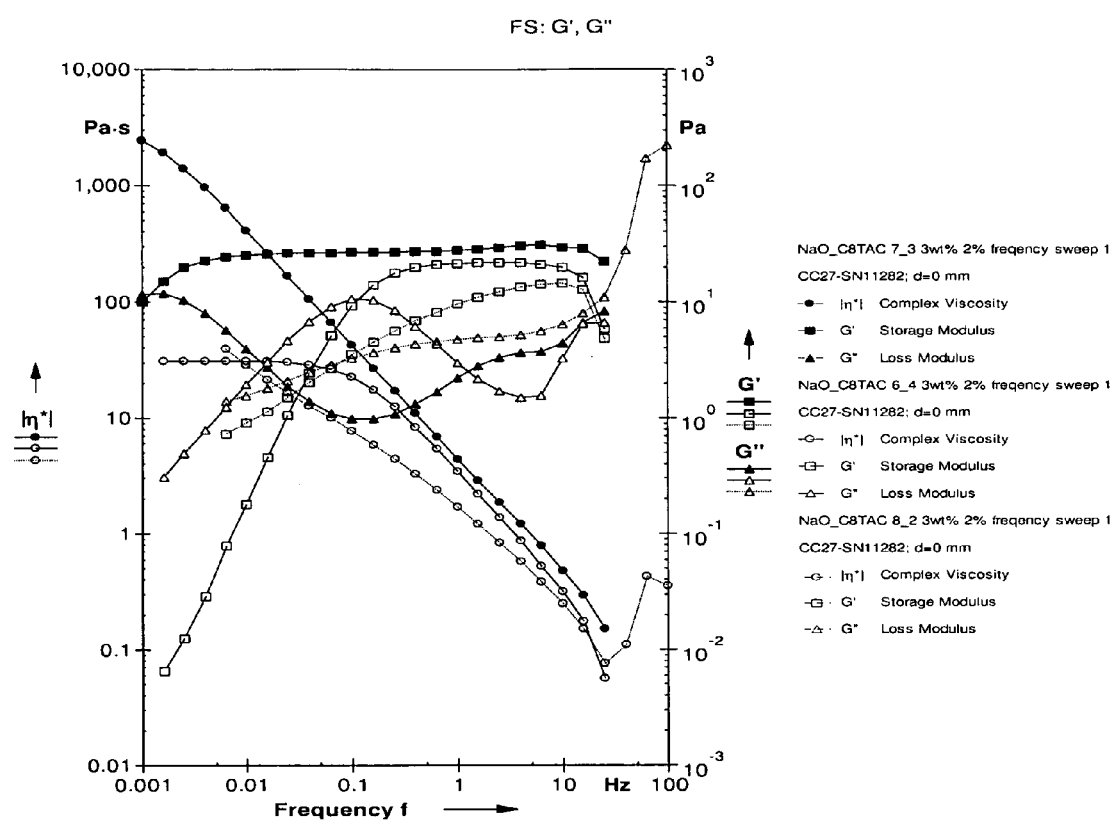
FIGS. 4-5 are plots of complex viscosity, storage modulus, and loss modulus as a function of frequency for the samples from Example 3.
Figure 5:
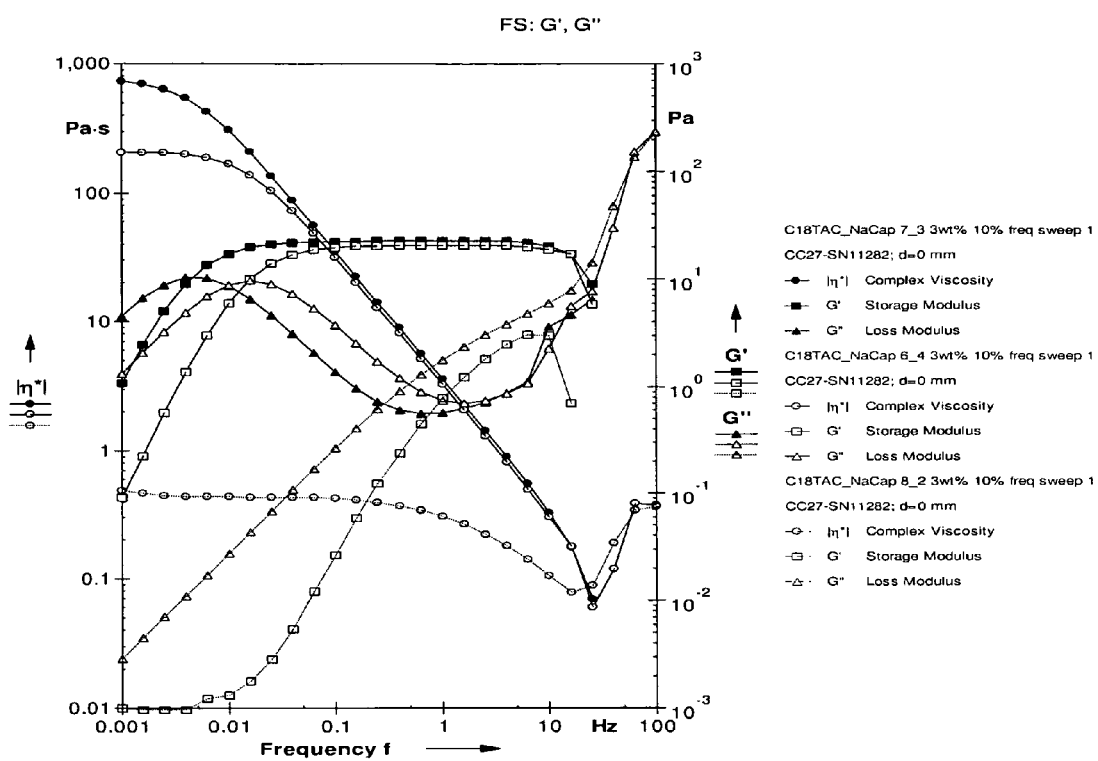

The dynamic properties of CASP-VCs of the type described herein were investigated. Specifically, the complex viscosity, storage modulus, and loss modulus as a function of frequency for Samples 1-3 and 5-7 from Example 1 were determined. FIGS. 4 and 5 are plots of complex viscosity, storage modulus, and loss modulus as a function of frequency for Samples 1-3 and Samples 5-7 respectively. The results demonstrated that these fluids displayed both a significant loss modulus and storage modulus, thereby proving their viscoelasticity.

Example 4

Figure 6:
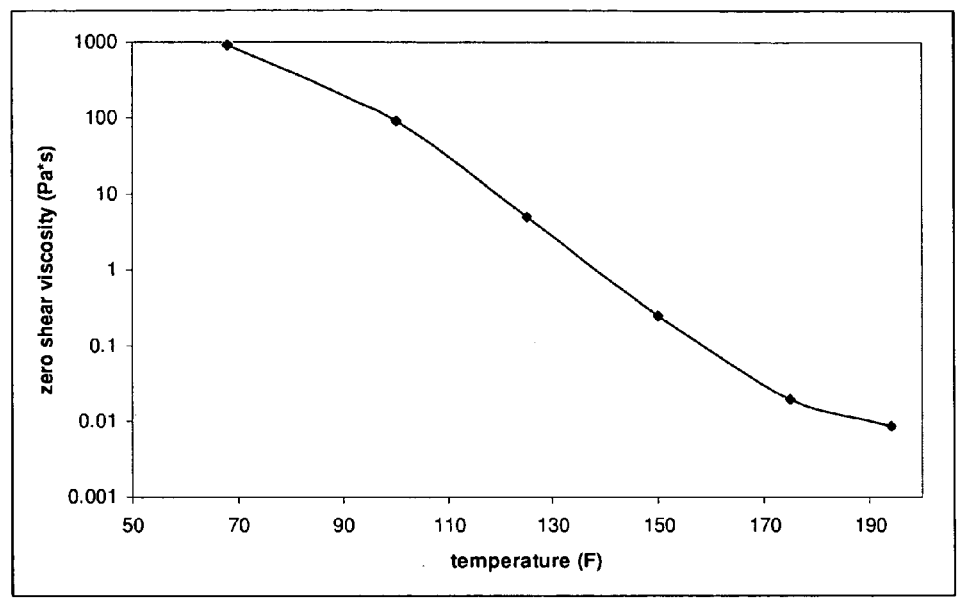
FIGS. 6-7 is a plot of zero shear viscosity as a function of temperature for the samples from Example 4.
Figure 7:
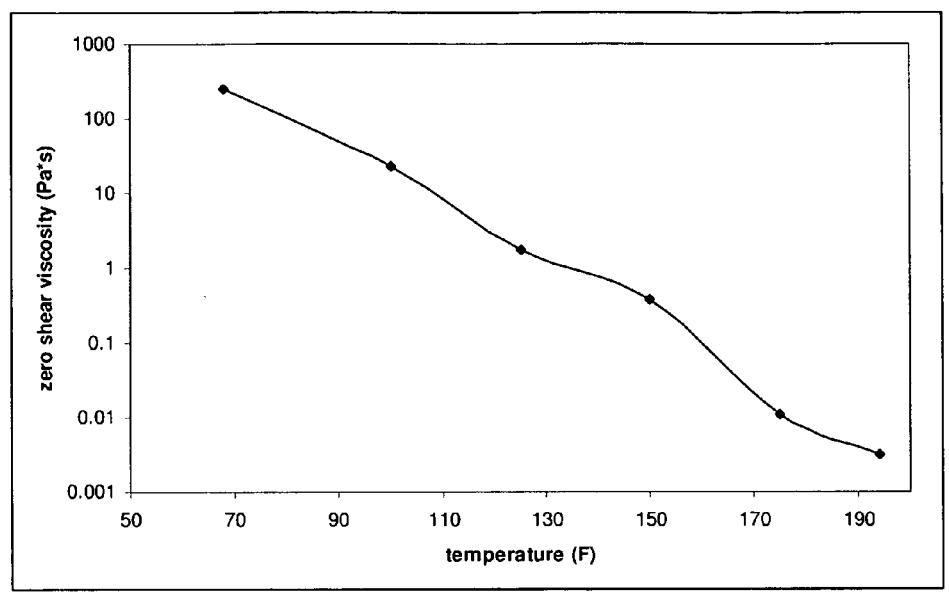

The effect of temperature on the viscosity of CASP-VCs was investigated. The zero shear viscosities of Samples 1 and 5 from Example 1 were tested over the temperature range of 70° F. to 190° F. The results for both an anionic rich CASP-VC (Sample 1) and a cationic rich CASP-VC (Sample 5) are shown in FIGS. 6 and 7 respectively.

The results demonstrated that for there was a decrease in viscosity by several orders of magnitude in each sample as the temperature increased. However, the viscosity for the cationic and anionic rich CASP-VCs was still about 10 and 30 times greater respectively than that of water (viscosity of water at 194° F. is about 0.000315 Pa*s). Thus, even at high temperature, there is an appreciable viscosity increase when compared to water.

Without wishing to be limited by theory the observed decrease in viscosity as the temperature increased may be a result of the solubility of the CASPs in water increasing (i.e., the critical micelle concentration increased). The increased solubility of the CASP may lead to faster kinetics and shorter and smaller micelles. The presence of these shorter and smaller micelles may contribute to the observed decrease in viscosity.

One of ordinary skill in the art with the benefits of this disclosure may adjust the CASPs such that the viscosity of the CASP-VC has a reduced response to temperature. For example, one technique is to use alkyl chain surfactants such as $C_{22}$ cationic surfactants and $C_{22}$ zwitterionic surfactants. In addition, changes in surfactant phase behavior with temperature may be exploited (i.e., vesicle to wormlike micelle transition). The final approach is to increase the concentration of the surfactants in the CASP. By increasing the concentration, one may achieve the entanglement or crossover concentration even with much shorter length micelles. In other words, the viscoelastic response occurs when there is either an increase in concentration, length, or both.

The stability of the CASP-VC was also investigated. An anionic surfactant solution comprising sample 1 was prepared and observed over a time period of 7 days at a temperature of 25° C. The anionic surfactant was observed to degrade with time, as the single component solution became somewhat cloudy in a few weeks. Without wishing to be limited by theory, the double bond in the oleate alkyl chain may be oxidized, causing the surfactant to become the same as stearic acid sodium soap. Stearic acid sodium soap has a much lower solubility in water and may not form wormlike micelles as readily as oleic acid sodium soap.

An anionic-rich CASP-VC was also prepared and observed over a time period of 7 days at a temperature of 25° C. The anionic rich CASP-VC also became cloudy, displayed reduced viscosity and began to phase separate after a few weeks. This behavior may be exploited in that it may be useful for degradation of the viscoelastic material without the utilization of any added components. At higher temperatures, such break down of viscosity may occur on the order of days, which may be useful for a lost circulation pill, as it will allow the lost circulation material to dissolve and allow production to begin. A cationic rich CASP-VC was observed to remain stable for a time period of greater than 30 days at a temperature of 25° C.

Example 5

The temperature stability of a cationic rich CASP-VC was investigated and compared to a cationic only surfactant. The cationic rich CASP-VC, designated Sample 14, was cetyl trimethylammonium tosylate/sodium dodecylbenzene sulfonate (CTAT/SDBS) of 97:3 which was prepared as a 3 wt. % solution. The cationic only surfactant, designated Sample 15, was CTAT which was prepared as a 3 wt. % solution. The zero shear viscosities for Samples 14 and 15 were measured for a range of temperature of from 75° F. to 190° F. The results are shown in FIG. 8.

Figure 8:
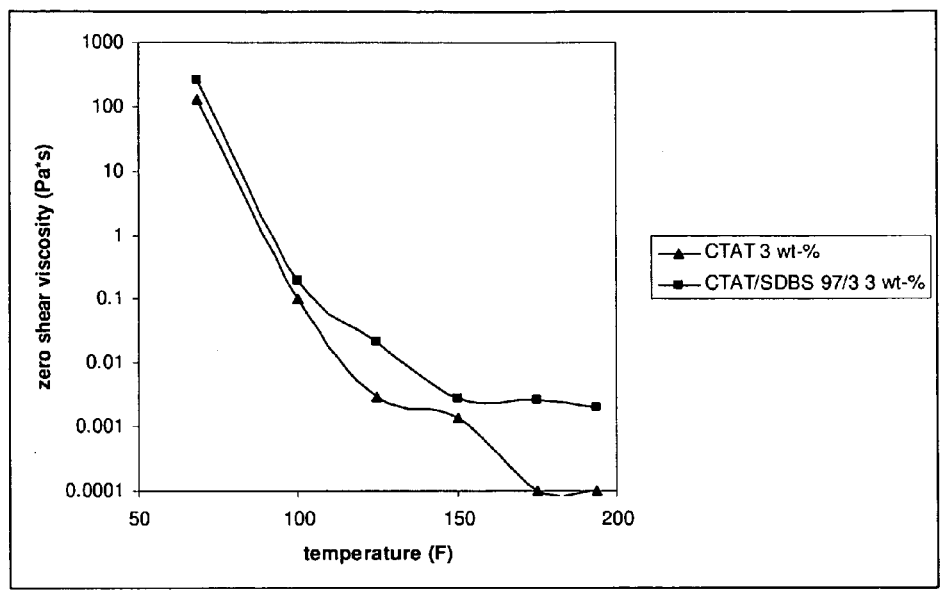
FIG. 8 is a plot of zero shear viscosity as a function of temperature for the samples from Example 5.

Referring to FIG. 8, the zero shear viscosity decreased as the temperature increased for both samples. However, the drop in zero shear viscosity at high temperature (about above 150° F.) for Sample 14 was less than Sample 15 because of the addition of the anionic surfactant. Without wishing to be limited by theory, the lesser drop in zero shear viscosity may be due to the greater binding of a surfactant versus a simple hydrotrope or due to the lower solubility of surfactants versus hydrotropes. Thus, these CASPs offer greater temperature stability than traditional surfactants.

Example 6

Figure 9:
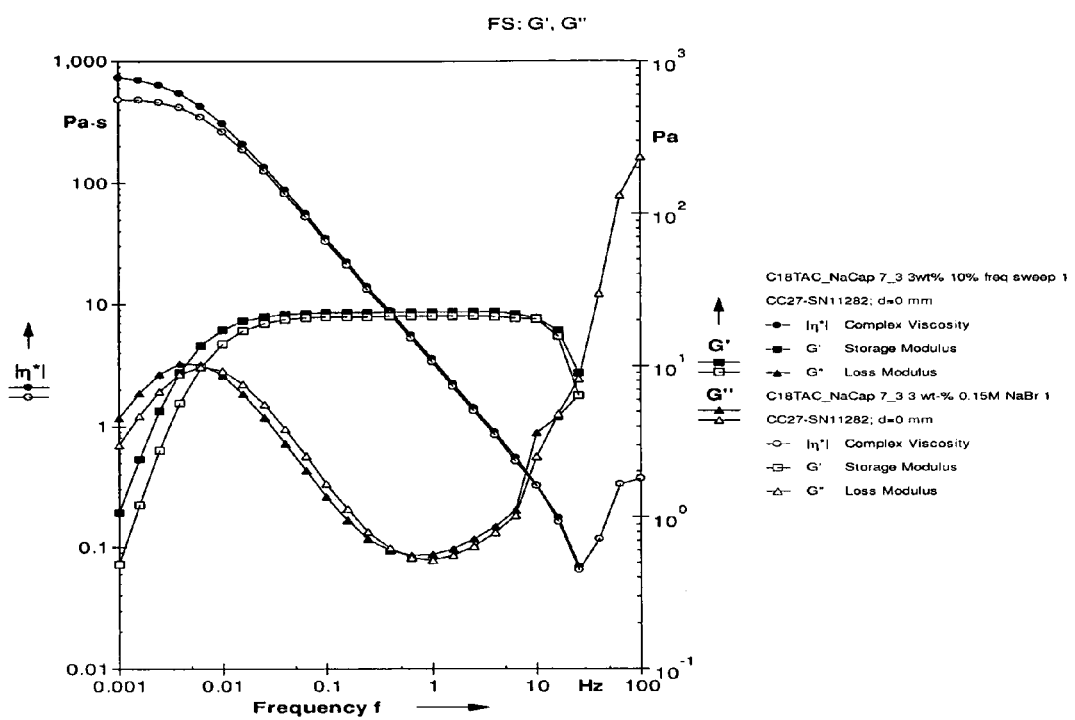
FIG. 9 is a plot of complex viscosity, storage modulus, and loss modulus as a function of frequency for the samples from Example 6.
Figure 10:
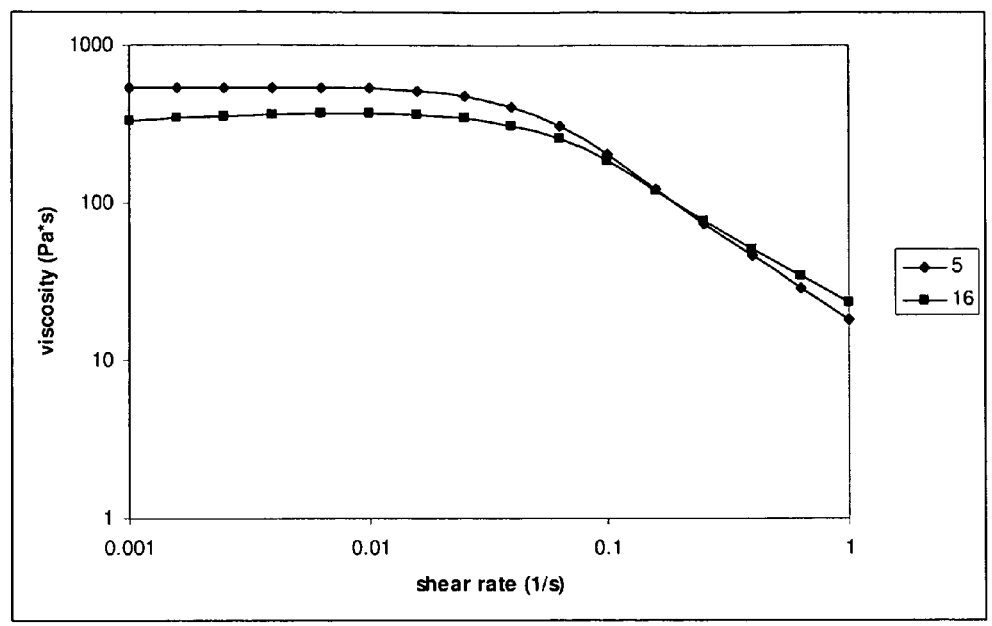
FIG. 10 is a plot of viscosity and shear stress as a function of shear rate for the samples from Example 6.

The tolerance of cationic rich and anionic rich CASP-VCs to salt was investigated. Sample 5 from Example 1 was selected for the cationic rich CASP-VC. A comparative sample of cationic rich CASP-VC in brine, designated Sample 16, was prepared from C18TAC/NaCap having 7:3 ratio which was prepared as a 3 wt. % solution (similar to Sample 5) and 0.15M sodium bromide (NaBr) brine. The complex viscosity, storage modulus, loss modulus, and zero shear viscosity of Samples 5 and 16 were measured and the results are shown in FIGS. 9 and 10. The results demonstrated that the CASP-VC was able to maintain its viscosity with the addition of salt. Without wishing to be limited by theory, this suggests that electrostatic interactions are not the dominant force in the creation of the viscoelasticity.

Figure 11:
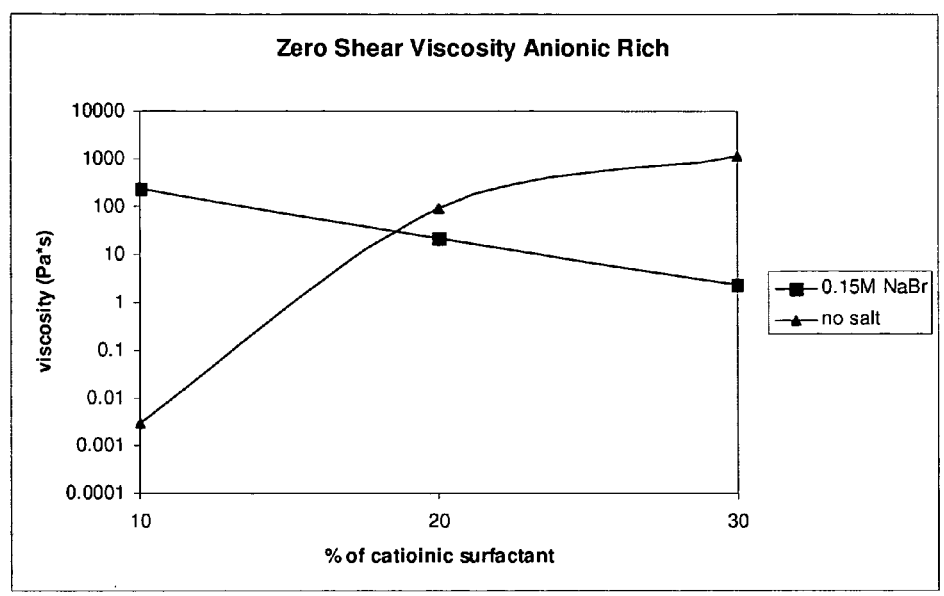
FIG. 11 is a plot of viscosity as a function of percentage of cationic surfactant for the samples from Example 6.

Sample 1 was selected for the anionic rich CASP. A comparative sample of anionic rich CASP-VC in brine, designated Sample 17 was prepared from NaO:$C_8$TAC ratio of 7:3 and 0.15M sodium bromide (NaBr) brine. The complex viscosity, storage modulus, loss modulus, and zero shear viscosity of Samples 1 and 17 were measured. The results are shown in FIG. 11. The results demonstrated that the anionic rich CASP-VC suffered a large drop in its viscoelastic properties with the addition of salt, which suggests that electrostatic interactions are creating the large zero shear viscosity. This viscosity can be regained by varying CAR to change the overall charge on the micelle.

Example 7

Figure 12:
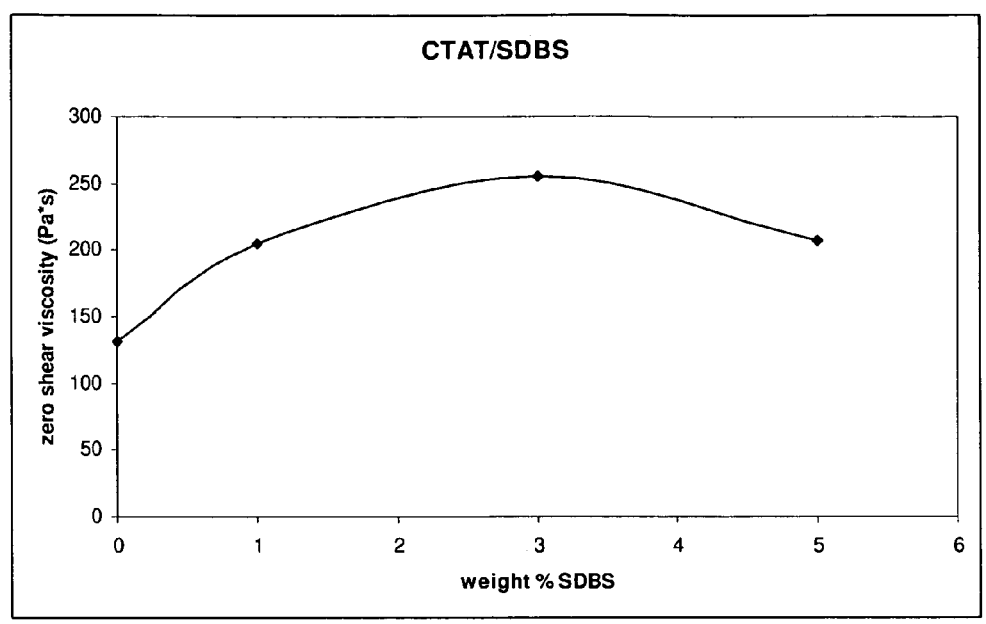
FIG. 12 is a plot of zero shear viscosity as a function of weight percentage of SDBS for the samples from Example 7.

The zero shear viscosity of CASP-VCs of the type described herein was investigated. Four samples, designated Samples 18-21, were prepared. Sample 18 was a 3 wt. % aqueous solution of cetyl trimethylammonium tosylate (CTAT). Samples 19-21 were CTAT/sodium dodecylbenzene sulfonate (SDBS) with a CAR of 99:1, 97:3, and 95:5 respectively and was prepared as a 3 wt. % aqueous solution. The zero shear viscosities of Samples 18-21 were determined to be 126, 205, 255, and 207 Pa*s respectively and are shown in FIG. 12. CTAT forms viscoelastic wormlike micellar solutions with high zero shear viscosities. By adding a small amount of SDBS in Samples 19-21, the solutions became highly viscous with increased zero shear viscosities when compared to Sample 18. Furthermore, the zero shear viscosity of Sample 20 was more than doubled (256,000 centipoise) when compared to Sample 18 (126,000 centipoise).

Another sample, designated Sample 22, was prepared. Sample 22 was CTAT/sodium octyl sulfate (SOS) with a CAR of 94:6 and was prepared as a 3 wt. % aqueous solution. The zero shear viscosity of Sample 22 was determined to be 470,000 centipoise, which was more than tripled when compared to sample 18. These results demonstrated the ability of CASPs to increase the viscosity of solutions.

Example 8

Figure 13:
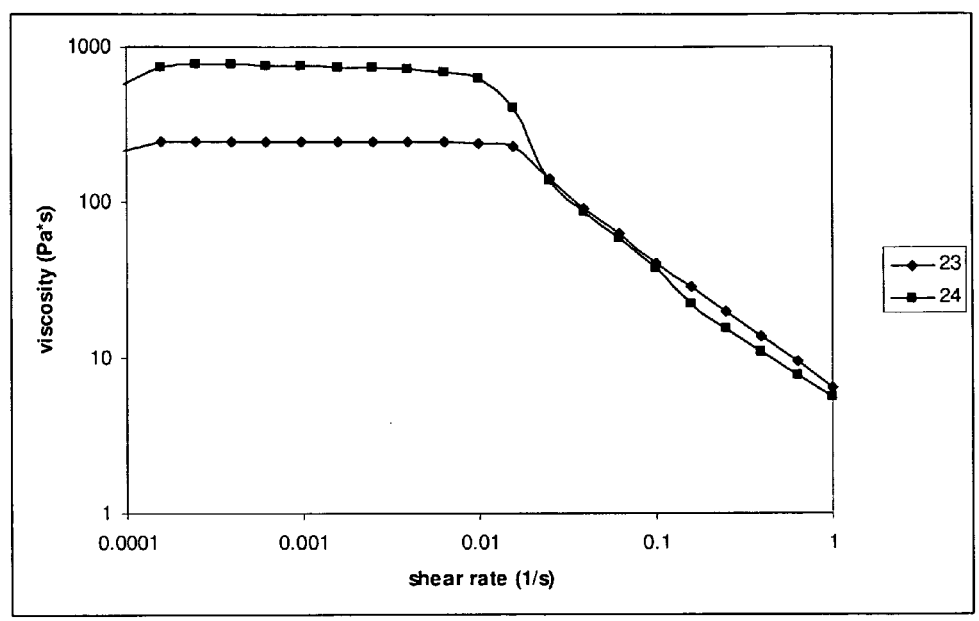
FIG. 13 is a plot of viscosity and shear stress as a function of shear rate for the samples from Example 8.

The effect of using surfactants containing longer alkyl chains on the properties of the CASP-VC was investigated. Three samples, designated Samples 23-25, were investigated. Samples 23 and 24, which were the cationic rich CASP, were prepared from erucyl bis-(hydroxy ethyl)methylammonium chloride (EHAC)/n-caprylic acid sodium salt (NaCap) with a CAR of 8:2 and 9:1 respectively as a 3 wt. % aqueous solution. Sample 25, which was the cationic rich CASP was prepared from erucyl bis-(hydroxy ethyl)methylammonium chloride/decanoic acid sodium salt with a cationic:anionic ratio of 9:1 as a 3 wt. % aqueous solution. The zero shear viscosities for Samples 23 and 24 were determined and the results are shown in FIG. 13. The viscosities of Samples 23-24 ranged from 200,000 to 800,0000 centipoise while the viscosity of Sample 25 was about 70,000 centipoise. The results demonstrate that the long chain surfactants that generate appreciable viscosity (>10 Pa*s) at elevated temperatures also form these cationic/anionic viscoelastic aggregates.

Next, the ability of hydrocarbon to reduce the viscosity of CASP-VC was investigated. A portion of samples 23-25 were placed in individual vials and a hydrocarbon fluid was introduced to each vial. The hydrocarbon fluid used for the test was diesel. Each vial was then shaken to mix the CASP-VC with diesel. Each vial was then inverted and visually observed. In the absence of the hydrocarbon, the CASPs form viscous masses that remained suspended for seconds, see Example 2. However, with the addition of a hydrocarbon, upon inversion of the vials the mass was not completely suspended and fluid was observed to flow for both the cationic rich and anionic rich CASPs.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
   placing within the wellbore a composition comprising a surfactant package the surfactant package comprising a cationic surfactant and a non-hydrotropic anionic surfactant, wherein the non-hydrotropic anionic surfactant is selected from the group consisting of sodium oleate, sodium dodecylbenzenesulfonate, sodium decanoate, sodium octyl sulfate, sodium caprylate, sodium stearate, sodium myristate, sodium laurate, sodium cetyl sulfate, sodium myristyl sulfate, sodium laurel sulfate, and sodium decyl sulfate,
   pumping the composition down to a lost circulation zone within the wellbore,
   contacting the composition with an aqueous solution in the lost circulation zone in the substantial absence of hydrotropes at an elevated temperature of from about 10° C. to about 200° C., wherein the substantial absence comprises a presence of less than about 0.1 wt. % of hydrotropes based on a total weight of the surfactant package, and
   forming a viscosified composition in the lost circulation zone that substantially seals the lost circulation zone.

2. The method of claim 1 wherein the cationic surfactant has a carbon chain length of from about 8 to about 24.

3. The method of claim 1 wherein the cationic surfactant comprises quaternary ammonium salt, ethoxylated quaternary ammonium salts, amine oxides, or a combination thereof.

4. The method of claim 1 wherein the cationic surfactant comprises stearyltrimethylammonium chloride, cetyltrimethylammonium tosylate, octyltrimethylammonium chloride, erucyl bis-(hydroxyethyl)methylammonium chloride, erucyl trimethylammonium chloride cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, or a combination thereof.

5. The method of claim 1 wherein the cationic surfactant is present in the surfactant package in an amount of from about 0.01 wt. % to about 99.99 wt. % based on the total weight of the surfactant package.

6. The method of claim 1 wherein the non-hydrotropic anionic surfactant has a carbon chain length of from about 8 to about 24.

7. The method of claim 1 wherein the non-hydrotopic anionic surfactant is present in the surfactant package in an amount of from about 0.01 wt. % to about 99.99 wt. % based on the total weight of the surfactant package.

8. The method of claim 1 wherein the surfactant package has a cationic surfactant:non-hydrotropic anionic surfactant ratio of from 1:100 to 100:1.

9. The method of claim 1 wherein the surfactant package is contacted with the aqueous solution in an amount of from about 0.01 grams to about 20 grams per 80 grams of the aqueous solution.

10. The method of claim 1 wherein the aqueous solution comprises water, brine, a wellbore servicing fluid, or a combination thereof.

11. The method of claim 10 wherein the brine comprises ammonium chloride, potassium chloride, sodium chloride, zinc bromide, calcium chloride, calcium bromide, sodium bromide, potassium formate, sodium formate, cesium formate or a combination thereof.

12. The method of claim 10 wherein the wellbore servicing fluid comprises cement slurries, drilling fluids, spacer fluids, fracturing fluids, gravel pack fluids, workover fluids, completion fluids, or a combination thereof.

13. The method of claim 1 wherein the viscosified composition is solids free.

14. The method of claim 1 wherein the viscosified composition has a viscosity of from about 0.001 Pa*s to about 100,000 Pa*s at the elevated temperature.

15. The method of claim 1 wherein the viscosified composition has a zero shear viscosity of from about 0.001 Pa*s to about 100,000 Pa*s at the elevated temperature.

16. The method of claim 1 wherein the viscosified composition has a complex viscosity of from about 10 Pa*s to about 10,000 Pa*s at a frequency range of from about 0.00001 Hz to about 1000 Hz.

17. The method of claim 9 wherein the viscosified composition has a storage modulus of from about 0.001 Pa to about 1,000 Pa at a frequency range of from about 0.00001 Hz to about 1000 Hz.

18. The method of claim 9 wherein the viscosified composition has a loss modulus of from about 0.001 Pa to about 1,000 Pa at a frequency range of from about 0.00001 Hz to about 1000 Hz.

19. The method of claim 1 further comprising contacting the viscosified composition with a viscosity breaker.

20. The method of claim 19 wherein the viscosity breaker comprises a hydrocarbon fluid, an internal breaker, or a combination thereof.

21. The method of claim 1 wherein the viscosified composition comprises a solids free post perforation pill or a gravel pack fluid loss pill.

22. A method of servicing a wellbore comprising:
    forming a composition comprising a surfactant package, the surfactant package comprising a cationic surfactant and an anionic surfactant, wherein the cationic surfactant is selected from the group consisting of stearyltrimethylammonium chloride, cetyltrimethylammonium tosylate, octyltrimethylammonium chloride, erucyl bis-(hydroxyethyl)methylammonium chloride, erucyl trimethylammonium chloride cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, and decyltrimethylammonium bromide, and wherein the anionic surfactant is selected from the group consisting of sodium oleate, sodium dodecylbenzenesulfonate, sodium decanoate, sodium octyl sulfate, sodium caprylate, sodium stearate, sodium myristate, sodium laurate, sodium cetyl sulfate, sodium myristyl sulfate, sodium lauryl sulfate, and sodium decyl sulfate, placing the composition within the wellbore, pumping the composition to a lost circulation zone within the wellbore, contacting the composition with an aqueous solution in the lost circulation zone in the substantial absence of hydrotropes at an elevated temperature of from about 10° C. to about 200° C., wherein the substantial absence comprises a presence of less than about 0.1 wt. % of hydrotropes based on a total weight of the surfactant package, and forming a viscosified composition in the lost circulation zone that substantially seals the lost circulation zone.

23. The method of claim 22 wherein the cationic surfactant has a carbon chain length of from about 8 to about 24.

24. The method of claim 22 wherein the anionic surfactant has a carbon chain length of from about 8 to about 24.

25. The method of claim 22 wherein the cationic surfactant is present in the surfactant package in an amount of from about 0.01 wt. % to about 99.99 wt. % based on the total weight of the surfactant package and wherein the anionic surfactant is present in the surfactant package in an amount of from about 0.01 wt. % to about 99.99 wt. % based on the total weight of the surfactant package.

* * * * *